(12) United States Patent
Wu et al.

(10) Patent No.: US 6,823,377 B1
(45) Date of Patent: Nov. 23, 2004

(54) ARRANGEMENTS AND METHODS FOR LATENCY-SENSITIVE HASHING FOR COLLABORATIVE WEB CACHING

(75) Inventors: Kun-Lung Wu, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,904

(22) Filed: Jan. 28, 2000

(51) Int. Cl.[7] .............................................. G06F 15/173
(52) U.S. Cl. ...................................... 709/223; 709/215
(58) Field of Search ............................... 709/214–215, 709/224; 710/118, 129

(56) References Cited

U.S. PATENT DOCUMENTS

| | | | | |
|---|---|---|---|---|
| 5,933,849 A | * | 8/1999 | Srbljic et al. ................ | 711/118 |
| 5,935,207 A | * | 8/1999 | Logue et al. ................ | 709/219 |
| 6,026,474 A | * | 2/2000 | Carter et al. ................ | 711/202 |
| 6,070,191 A | * | 5/2000 | Narendran et al. ......... | 709/226 |
| 6,167,438 A | * | 12/2000 | Yates et al. ................. | 709/216 |
| 6,167,446 A | * | 12/2000 | Lister et al. ................. | 709/223 |
| 6,185,601 B1 | * | 2/2001 | Wolff .......................... | 709/203 |
| 6,205,481 B1 | * | 3/2001 | Heddaya et al. ............ | 709/226 |
| 6,286,084 B1 | * | 9/2001 | Wexler et al. ............... | 711/152 |
| 6,330,561 B1 | * | 12/2001 | Cohen et al. ................. | 707/10 |
| 6,330,605 B1 | * | 12/2001 | Christensen et al. ........ | 709/226 |
| 6,330,606 B1 | * | 12/2001 | Logue et al. ................ | 709/226 |
| 6,338,117 B1 | * | 1/2002 | Challenger et al. ......... | 711/122 |
| 6,377,980 B1 | * | 4/2002 | Hagersten et al. .......... | 709/213 |
| 6,377,991 B1 | * | 4/2002 | Smith et al. ................. | 709/226 |
| 6,405,252 B1 | * | 6/2002 | Gupta et al. ................. | 709/224 |
| 6,408,362 B1 | * | 6/2002 | Arimilli et al. ............. | 711/133 |
| 6,438,652 B1 | * | 8/2002 | Jordan et al. ................ | 711/120 |
| 6,502,175 B1 | * | 12/2002 | Krishnan et al. ........... | 711/170 |
| 6,532,492 B1 | * | 3/2003 | Presler-Marshall .......... | 709/223 |

FOREIGN PATENT DOCUMENTS

| | | |
|---|---|---|
| WO | WO00/22526 A1 | 4/2000 |
| WO | WO00/58871 A2 | 10/2000 |

OTHER PUBLICATIONS

Kawai, E. e tal., "An Analysis of the Number of ICP Packets on the Distributed WWW Caching System, International Workshop on Parallel Processing", pp. 234–239, 1999.*
S. Gadde et al., "Directory Structures for Scalable Intenet Caches", Department of Computer Science, Duke University, Durham, NC 27708–0129, Nov. 1997, pp. 1–14.*
Heddaya et al, "WebWave: globally load balanced fully distributed caching of hot published documents" 1997, International Conference on Distributed Computing Systems, pp. 160–168.*
Chiang et al., "On Request Forwarding for Dynamic Web Caching Hierachies", 2000, IEEE, pp. 262–269.*
ASAKA, et al, "Distributed Web Caching using Hash–based Query Caching Method", 1999, IEEE, pp. 1620–1625.*
Yu et al, "Performance study of a collaborative method for hierarchial caching in proxy servers", Apr. 1998, Computer networks and ISDN systems, vol. 30, No. 1–7, pp. 215–224.*
Kun–Lung Wu et al., "Load balancing and Hot Spot Relief for Hash Routing Among a Collection of Proxy Caches", IEEE International Conference on Distributed Computing Systems, pp. 536–543, 1999.*

(List continued on next page.)

*Primary Examiner*—Bunjob Jaroenchonwanit
(74) *Attorney, Agent, or Firm*—Ference & Associates (57) ABSTRACT

Systems and methods for collaborative web caching among geographically distributed cache servers, particularly, latency-sensitive hashing systems and methods for collaborative web caching among geographically distributed proxy caches. Network latency delays as well as proxy load conditions are taking into consideration during hashing. As a result, requests can be hashed into geographically closer proxy caches if the load conditions permit. Otherwise, requests will be hashed into geographically distant proxy caches to better balance the load among the caches.

25 Claims, 7 Drawing Sheets

OTHER PUBLICATIONS

Colajanni, M. et al., "Dynamic Load Balancing in Geographically Distributed Heterogeneous Web Servers", International Conference on Distributed Computing Systems, pp. 295–302, 1999.*

M.D. Dahlin et al., "Cooperative Caching: Using Remote Client Memory to Improve File System Performance", University of California at Berkeley, 14 pages, 1994.*

Inohara, S. et al., "Self–Organizing Cooperative WWW Caching", International Conference on Distributed Computing Systems, pp. 74–83, 1998.*

Alanyali, M., "On simple algorithms for dynamic load balancing", Annual Joint Conference of the IEEE Computer and Communications Societies, pp. 230–238, vol. 1, Apr. 1995.*

Guerney D. H. Hunt et al., "Network Dispatcher: a connection route for scalable Internet services", Computer Networks and ISDn System 30 (1998), p. 347–357.*

K.L.E. Law, et al, "A scalable and distributed WWW proxy system", Proceeding IEEE International Conference on Multimedia Computing and Systems, Ottawa, Canada, Jun. 3–6, 1997, pp. 565–571.*

A. Mourad et al, "Scalable Web server Architectures", Proceedings IEEE Symposium on Computers and Communications, 1997, pp. 12–16.*

V. Valloppillil and K.W. Ross, "Cache Array Routing Protocol, v 1.0", Feb. 1998, Internet Draft, http://irache.net/Cahce/ICP/carp.txt.

K.W. Ross, "Hash–Routing for Collections of Shared Web Caches", IEEE Network Magazine, Nov.–Dec. 1997, pp. 37–44.

D. Karger et al., "Web Caching with Consistent Hashing", Proc., of 8th International World Wide Web Conference, 1999, pp. 125–135.

* cited by examiner

ARRANGEMENTS AND METHODS FOR LATENCY-SENSITIVE HASHING FOR COLLABORATIVE WEB CACHING

FIELD OF THE INVENTION

The present invention generally relates to the caching of web objects on network proxy servers located between client machines and content servers.

BACKGROUND OF THE INVENTION

In recent years, the growth of the Internet has exploded, especially with regard to the World Wide Web. As a consequence, user response times for accessing the Web have become increasingly unsatisfactory.

One common conventional approach to improving Web performance is to deploy proxy cache servers between clients and content servers. With proxy caching, most client requests can be serviced by the proxy caches, reducing latency delays. Network traffic on the Internet can also be significantly reduced in this manner, thus greatly reducing network congestion. In fact, many commercial companies are providing hardware and software products and solutions for Web caching, such as IBM, Sun Microsystems, Inktomi, Network Appliance and Akamai. Some of them are using geographically distributed data centers for collaborative web caching. Namely, many geographically distributed proxies are increasingly used to collaborate in web caching.

To collaborate in web caching, a coordinating protocol is generally required. Hash routing is an emerging approach to coordinating a collection of collaborating proxy caches. Examples of hash routing include the "cache array routing protocol" (CARP) and "consistent hashing". In "Cache Array Routing Protocol, v 1.0," (Internet Draft, http://www.ircache.net/Cache/ICP/carp.txt, February 1998, V. Valloppillil and K. W. Ross), the draft of CARP is described. In "Hash-Routing for Collections of Shared Web Caches," (*IEEE Network Magazine*, pp. 37–44, November–December 1997, K. W. Ross), the performance of CARP and other protocols is analyzed. In "Web Caching with Consistent Hashing," (*Proc. Of 8th International World Wide Web Conference*, pp. 125–135, 1999, D. Karger et al.), the application of consistent hashing to web caching is described Basically, hashing partitions the entire URL space among the caches, creating a single logical cache. Each cache is responsible for requests belonging to the assigned partition. Requests are sent to the proper proxy caches based on the hash values of the corresponding URLs. The mapping between hash values and proxy cache IDs can be done either by the browsers or by the domain name servers (DNS).

More and more geographically distributed proxies are used in collaborative web caching. For example, commercial companies, such as Akamai and Inktomi, are using cache servers residing on geographically distributed data centers for web caching. As a result, response times tend to be negatively impacted for those requests hashed into geographically distant proxies or overloaded proxies. Distant proxies tend to incur longer network latency delays. Overloaded proxies can cause significant delays as well, no matter how close they are to the browsers. As a result, a user may experience unpredictably slow response times for certain URL requests that are hashed into far away or overloaded proxy caches.

However, traditional hashing-based approach to collaborative web caching does not deal with network latency. It either avoids hashing into geographically distant proxy caches or hashes to all proxy caches regardless of network latency. For example, in "Web Caching with Consistent Hashing," (*Proc. Of 8th International World Wide Web Conference*, pp. 125–135, 1999), a user's geographical region is encoded into the hash value and sent by the browser to a DNS in its geographical region. The DNS then maps the encoded hash value to a proxy cache ID within the same region. Thus, requests are served only by proxies in a geographically close region. It works well if the proxy caches within a region can adequately service all the requests originated within the same region. However, if workloads are skewed among regions, proxies in one region may be overloaded while those in another region are underloaded. As a result, the degree of collaboration among proxies is limited by geographical locations.

On the other hand, one can simply hash requests into all collaborating proxy caches regardless of geographical locations. In this case, load tends to be more balanced among all the geographically distributed cooperating caches. However, it does not take into account network latency delays due to geographical distances. It does not deal with "hot spots", either. A "hot spot" may be defined as a website or web page that experiences tremendous demand over a very short period of time, or a brief "spike" in the number of users wishing to access the website or web page. In the presence of hot spots, all the references to the hot spots are hashed into the same proxies. As a result, the proxies that handle the hot spots can easily become overloaded.

Therefore, a need has been recognized in connection with attending to the latency issue in hashing-based web caching. More specifically, a need has been recognized in connection with providing a latency-sensitive hashing for collaborative web caching among geographically distributed proxy caches.

SUMMARY OF THE INVENTION

In accordance with the at least one presently preferred embodiment of the present invention, the mentioned latency problems associated with the hashing-based approach to collaborative web caching are solved. Latency-sensitive hashing systems and methods are contemplated herein for collaborative web caching among geographically distributed proxy caches.

In one embodiment of the present invention, URL requests are hashed into all proxies. However, it takes into account latency delays and potential overloaded proxies in choosing the target proxy for a request. In one embodiment of the present invention, a request is first hashed into an anchor hash partition. Each hash partition is mapped to one of the geographically distributed proxies. Secondly, a selection algorithm is used to pick a proxy among a small number of hash partitions adjacent to the anchor hash partition. The selection is based on an objective to reduce network latency and to avoid creating overloaded proxies.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
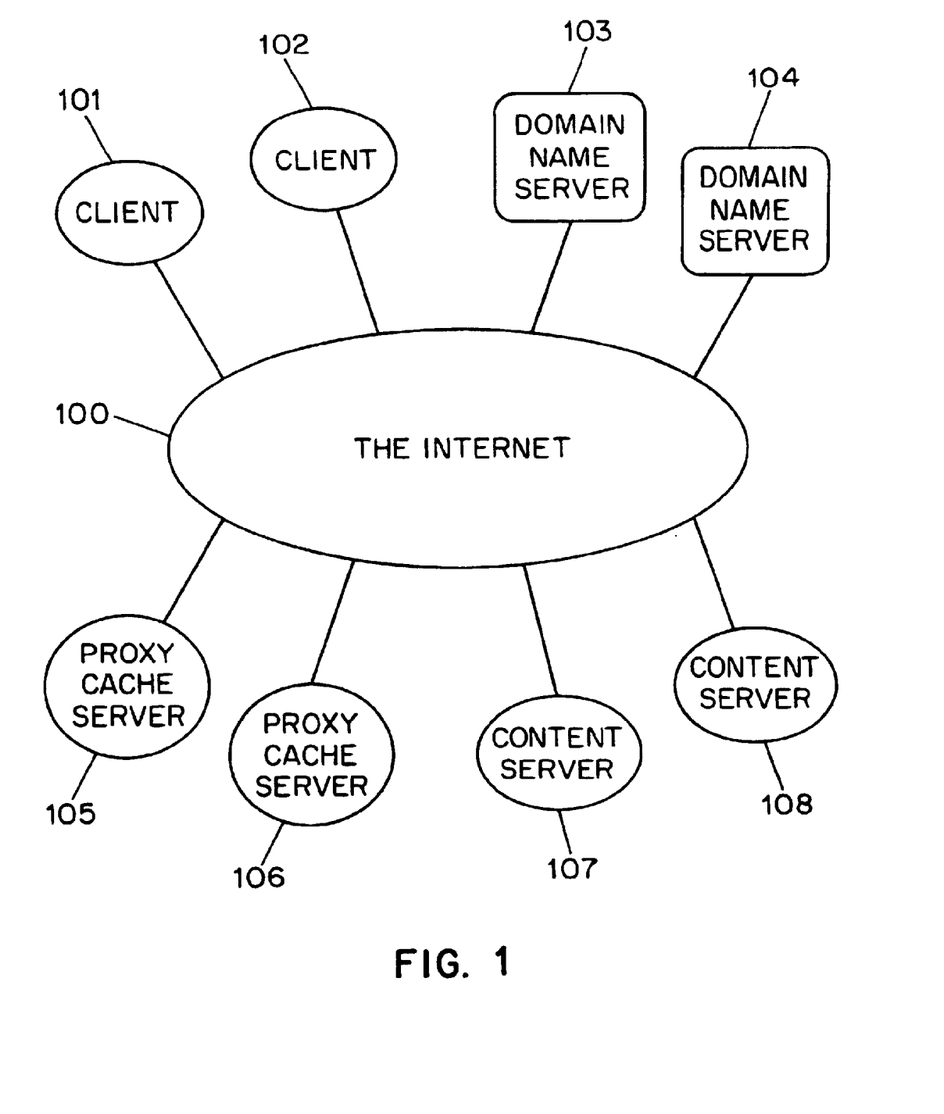
FIG. 1 is a block diagram of a network system that supports web caching.

FIG. 1 is a block diagram of a network system that supports web caching among distributed proxy caches in accordance with an exemplary embodiment of the present invention. Proxy cache servers 105, 106 are deployed within the Internet 100 between client machines 101, 102 and content servers 107, 108. Domain name servers 103, 104 are used also within the Internet 100 to map logical host names into physical IP addresses. Similar to content servers 107, 108, proxy caches 105, 106 are typically powerful server computer systems with tremendous storage space, including main memory and disks. For example, IBM's SP/2, RS/6000 servers and PC servers can be used as both proxy cache servers and content servers. On the other hand, client machines 101, 102 are typically PCs or workstations.

Note that the terms "proxy cache server(s)", "proxy cache(s)", "proxy server(s)" and "proxy(ies)" are used interchangeably throughout the present disclosure. All of these terms are used to represent the computer systems that cache web objects in the Internet 100 between client machines 101, 102 and content servers 107, 108. Proxy caches 105, 106 can be geographically remote among them. Some of them can be in a local cluster. But, one cluster can be in a distant location from another cluster geographically. For example, a cluster of proxy caches can be located in the San Jose, Calif., area while another cluster of proxy caches can be located in the New York City area.

Users of the client machines 101, 102 access the information stored on the content servers 107, 108 through the Internet 100. With the employment of proxy caches 105, 106, client requests are first sent to the proxy caches 105, 106, instead of the content servers 107, 108. If requested objects are found on the proxy caches 105, 106, the objects are returned to the client machines 101, 102 directly from the proxy caches 105, 106. On the other hand, if requested objects are not found on the proxy caches 105, 106, requests are then forwarded to the content servers 107, 108.

Typically, some type of browser software, such as the Netscape Navigator by Netscape Communications or the Internet Explorer by Microsoft Corp., will be running on the client machine 101, 102. The user of a client machine typically specifies a URL, such as http://www.ibm.com. on the location field of a browser to go to a Web site. In hashing-based collaborative web caching, such a URL is used to compute a hash value, which in turn is mapped into one of the proxies. The hashing of a URL to a proxy cache server can be done by the browser software in the client machine. In this case, the logical host name of the proxy is typically used by the browser. This logical name needs to be mapped into a physical IP address by a domain name server in the network. Alternatively, the browser software can simply compute a URL into a hash value and then send the hash value to a domain name server. The mapping of a hash value to the physical IP address of a proxy is then done by the domain name server. Once the IP address of the target proxy is identified, the request is sent to it. If the requested object can be found locally on the proxy cache, then it is returned directly from the proxy to the client machine. Otherwise, the request is forwarded by the proxy cache to the content server.

It will be appreciated that the mapping of a hash value to a proxy cache among a collection of collaborative proxies is preferably done by a domain name server. This is because it is more efficient for the domain name servers to keep track of the changes in the collaborative proxy caches. Some of them may be removed from the network while others may be added. It is difficult to propagate such changes to each and every client machine in the Internet. Theoretically, however, the mapping can be performed by the browser software in a client machine. In such a case, it is generally done on the logical host name, not the physical IP address. The browser still sends the logical proxy name to a domain name server for the physical IP address. Thus, it is preferable that the latency-sensitive hashing be executed by a domain name server. The browser only computes the hash value and sends it to a domain name server for mapping it to the UP address of one of the collaborative proxy caches.

Figure 2:
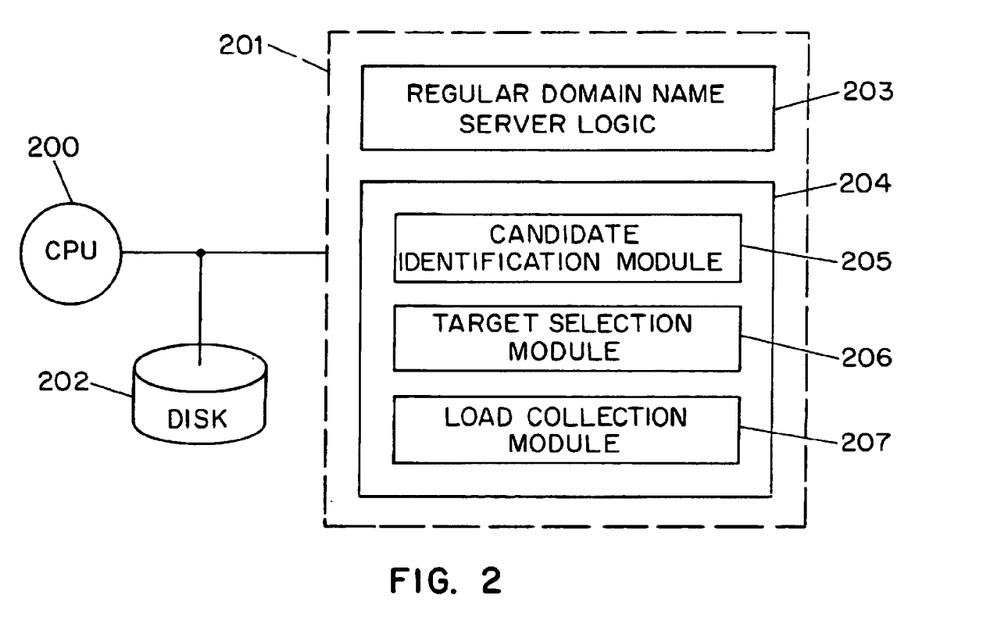
FIG. 2 is a block diagram of a domain name server system that supports latency-sensitive hashing.

FIG. 2 is a block diagram of a domain name server system that supports latency-sensitive hashing in accordance with an exemplary embodiment of the present invention. The domain name server system (103, 104 in FIG. 1) is a computer system that includes CPU 200, disk 202 and dynamic random memory 201. The domain name server system is connected to the Internet.

The domain name server logic related to latency-sensitive hashing 204 is an executable program logic stored on the disk 202. It can be loaded onto the memory 201 to carry out the mapping of a hash value to the IP address of a proxy among a collection of collaborative proxy caches.

The regular domain name server logic 203 is also an executable program logic stored on the disk 202 and can be loaded onto the memory 201 to carry out other domain name server function.

The major functional modules of the latency-sensitive hashing logic 204 include a candidate identification module 205 (detailed in FIG. 5), a target selection module 206 (detailed description in FIG. 8) and a local collection module 207.

Figure 3:
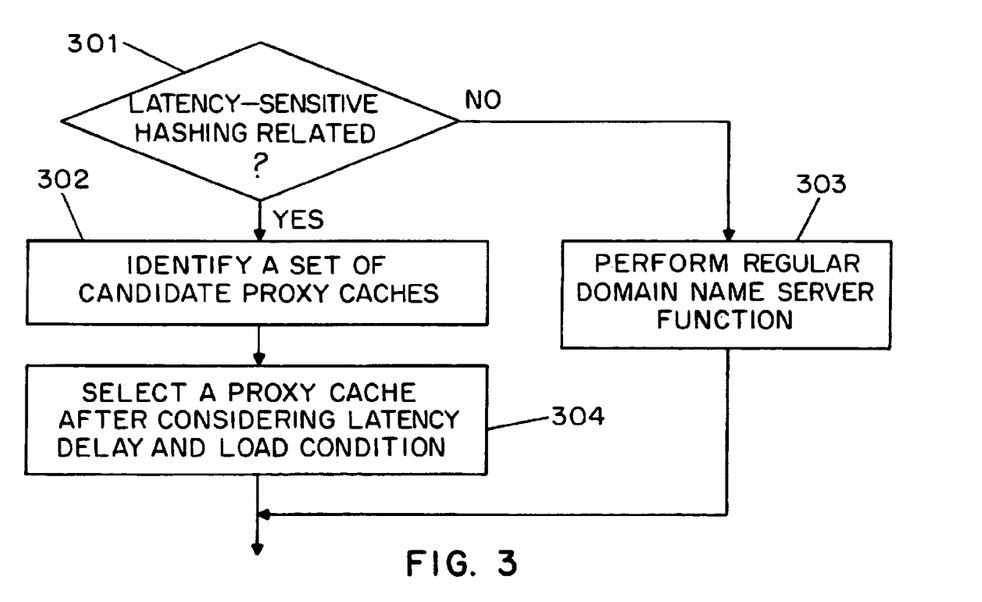
FIG. 3 is a flow chart diagram of an operation by a domain name server that supports latency-sensitive hashing among a collection of proxy caches.

FIG. 3 shows a flow chart diagram of a typical operation by a domain name server that supports latency-sensitive hashing among a collection of proxy caches. When a request comes in, the system first checks if it is related to latency-sensitive hashing 301. If no, it performs regular domain name server function 303. If yes, it first identifies a set of candidate proxy caches 302. From this set of candidate proxy caches, it then selects a proxy cache after taking into consideration the latency delay as well as load condition 304.

Figure 4:
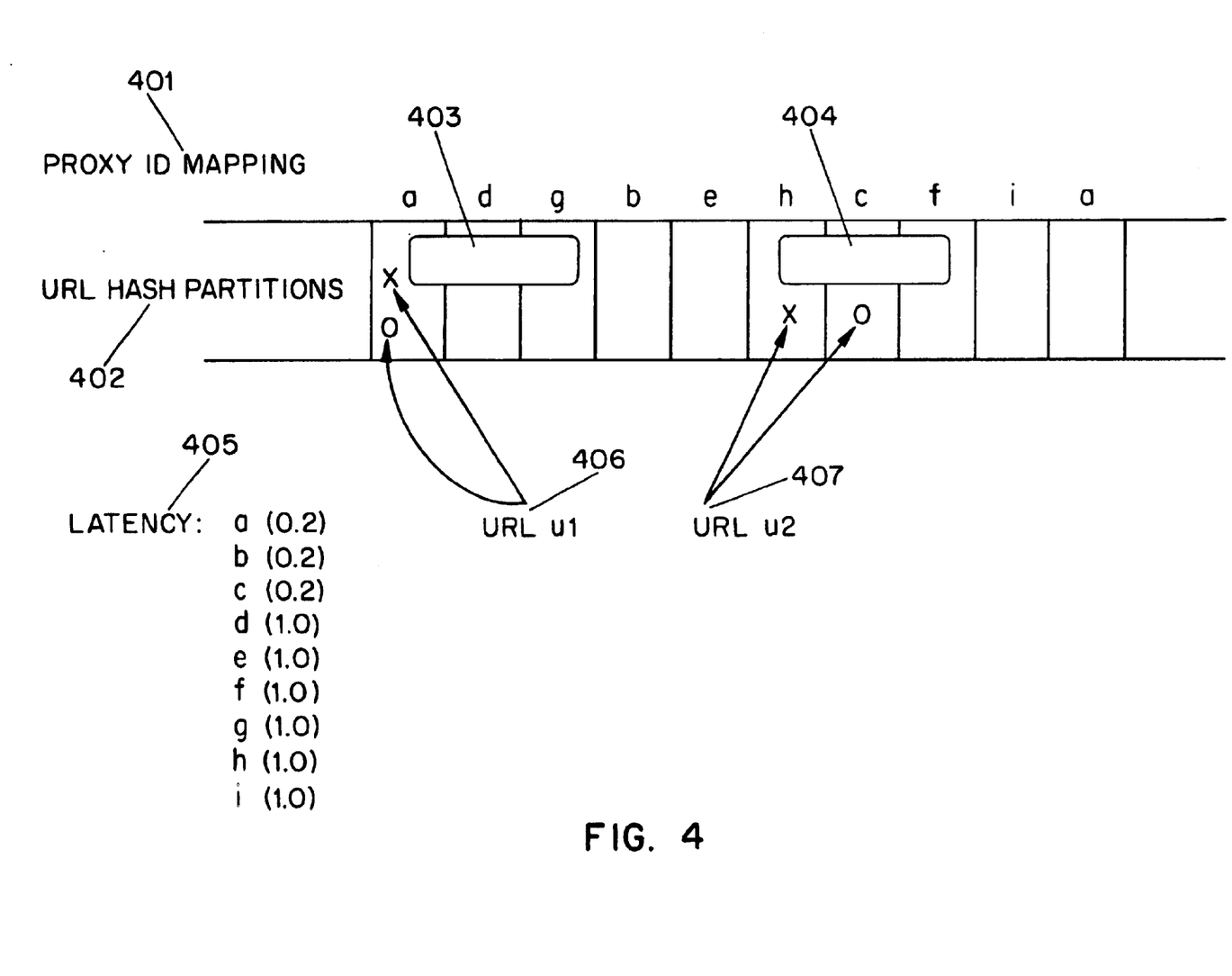
FIG. 4 is a schematic illustration of a latency-sensitive hashing.

FIG. 4 shows an example of a latency-sensitive hashing in accordance with an exemplary embodiment of the present invention. The hash value space is partitioned into a large number of hash partitions 402. Each URL hash value falls into one of the partitions. Each hash partition is mapped to a proxy ID 401. For instance, a, d, g, b, e, h, . . . , are the identifiers of proxies mapped to the hash partitions. As an example, it may be assumed that URL u1 406 and u2 407 are hashed into hash partitions corresponding to proxies a and h, respectively. Without considering latency, URL u1 will be hashed into proxy a and URL u2 into proxy h, respectively. However, in considering latency, two additional nearby proxies are first identified in the hash value space as the candidate proxies. Then, the latency delay specified in 405 is examined to select a proxy with the smallest latency delay. As a result, proxy a is selected as the target proxy for URL u1 and proxy c is selected as the target proxy for URL u2.

Figure 5:
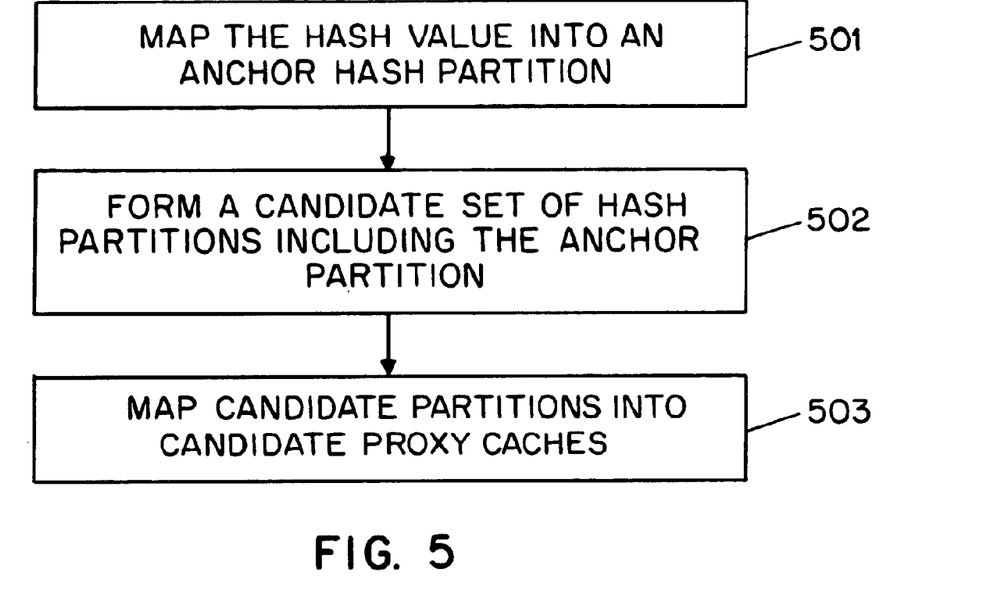
FIG. 5 is a flow chart diagram of the candidate identification module of FIG. 2.

FIG. 5 shows, in accordance with a preferred embodiment of the present invention, a flow chart diagram of the candidate identification module 205 in FIG. 2. Candidate identification module 205 is responsible for identifying a set of candidate proxy caches for a given hash value computed from a URL. The hash value is preferably computed by the browser software in a client machine (101, 102 in FIG. 1) since it can access the URL. In 501, the given hash value from a client machine is first mapped into an anchor hash partition. This can be easily done by partitioning the possible hash values into a predetermined number of partitions. The anchor partition can therefore be identified by checking the hash value against the boundaries of the hash partitions. Once the anchor hash partition is identified, in 502, a candidate set of hash partitions can be formed by including one or more nearby hash partitions to the anchor hash partition. The nearby hash partitions can be those with hash values greater than, or less than, or some greater than and some less than, that of the anchor hash partition. It will be appreciated that the hash partitions should be treated as a circular data structure. Namely, the partition with the largest hash values should wrap around and be next to the one with the smallest hash values. Finally, in 503, the set of candidate hash partitions are mapped into a set of candidate proxies. These candidate proxies will be examined by the target selection module (206 in FIG. 2) to find a target proxy based on latency delays and load conditions.

It will be appreciated that, if each hash partition has been initially assigned with the IP address of a proxy, it becomes quite easy to map the set of candidate hash partitions to the set of candidate proxy caches in 303. For example, a simple lookup will suffice. There are many different ways to assign hash partitions with proxy caches. One possible approach is simply by hashing each partition into an integer number between 1 and P, where P is the total number of proxy caches. Each number represents a proxy cache. If the total number of hash partitions is large enough, then these hash partitions will be more or less evenly distributed among all the proxy caches. Alternatively, one can first generate N/P random numbers between 0 and 1 for each proxy cache, where N is the total number of hash partitions and P is the total number of proxy caches. Each of the N/P random numbers is associated with the same corresponding proxy ID. Thus, there are N total random numbers generated, with N/P of them associated with one proxy ID. Secondly, these N random numbers are sorted into a list. Finally, one can assign each hash partition with the proxy ID associated with each random number in the sorted list.

It will also be appreciated that, as more and more data centers are built in various parts of the globe for caching web objects, distributed collaborative proxy caches can be viewed as geographically distributed clusters. Within each cluster, there can be one or more cache servers. Furthermore, the number of proxy cache servers in each cluster can be quite different. As a result, a special mapping approach may be employed to ensure that the target selection module (206 in FIG. 2) can easily find a proxy for a URL request within a close geographical region.

Figure 6:
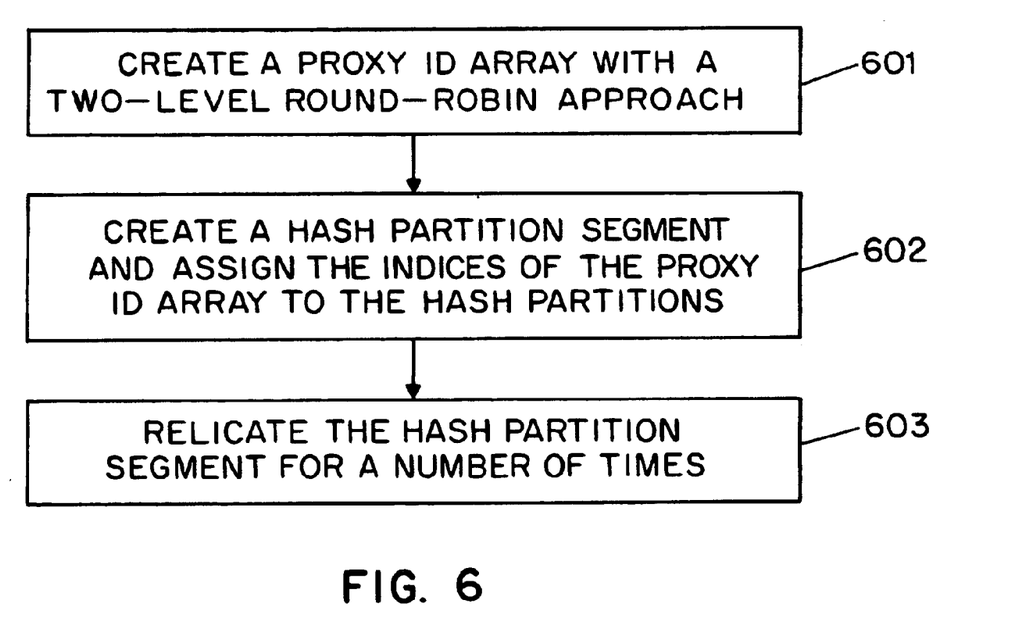
FIG. 6 is a flow chart diagram of an indirect mapping of hash partitions to proxies whose locations can be viewed as geographically distributed clusters.

FIG. 6 shows a flow chart diagram of an indirect mapping of hash partitions to proxies whose locations can be viewed as geographically distributed clusters. Assume that there are M clusters. The number of proxy caches in a cluster is denoted as $C_j$, j=1, 2, . . . , M. In 601, the indirect mapping first creates a proxy ID array with a two-level round-robin approach. Namely, it first chooses a cluster and then from within the chosen cluster it picks a proxy cache, all in a round-robin fashion, that is, for each cluster chosen, all proxy caches are chosen one at a time until they are exhausted. The total number of this proxy ID array is $M*LCM_c$, where $LCM_c$ is the least common multiple of $C_j$, j=1, 2, . . . , M. Secondly, in 602, a hash partition segment is created and each partition is assigned with an index of the proxy ID array created in 601. $P_j$ represents the number of times a proxy ID appears in the proxy ID array. Each proxy ID is to be mapped to $LCM_P$ hash partitions in the hash partition segment, where $LCM_P$ is the least common multiple of $P_j$, j=1, 2, . . . , M. As a result, the size of the hash partition segment is $LCM_P * \Sigma P_j$, j=1, 2, . . . , M. Since there are $P_j$ appearances of proxy j in the proxy ID array and there are a total of $LCM_P$ hash partitions to be mapped with the indices of proxy j, each index will be assigned to $LCM_P/P_j$ hash partitions in the segment. After the construction of the hash partition segment, in 603, the hash partition segment is replicated for a number of times to construct the entire hash partitions.

Figure 7:
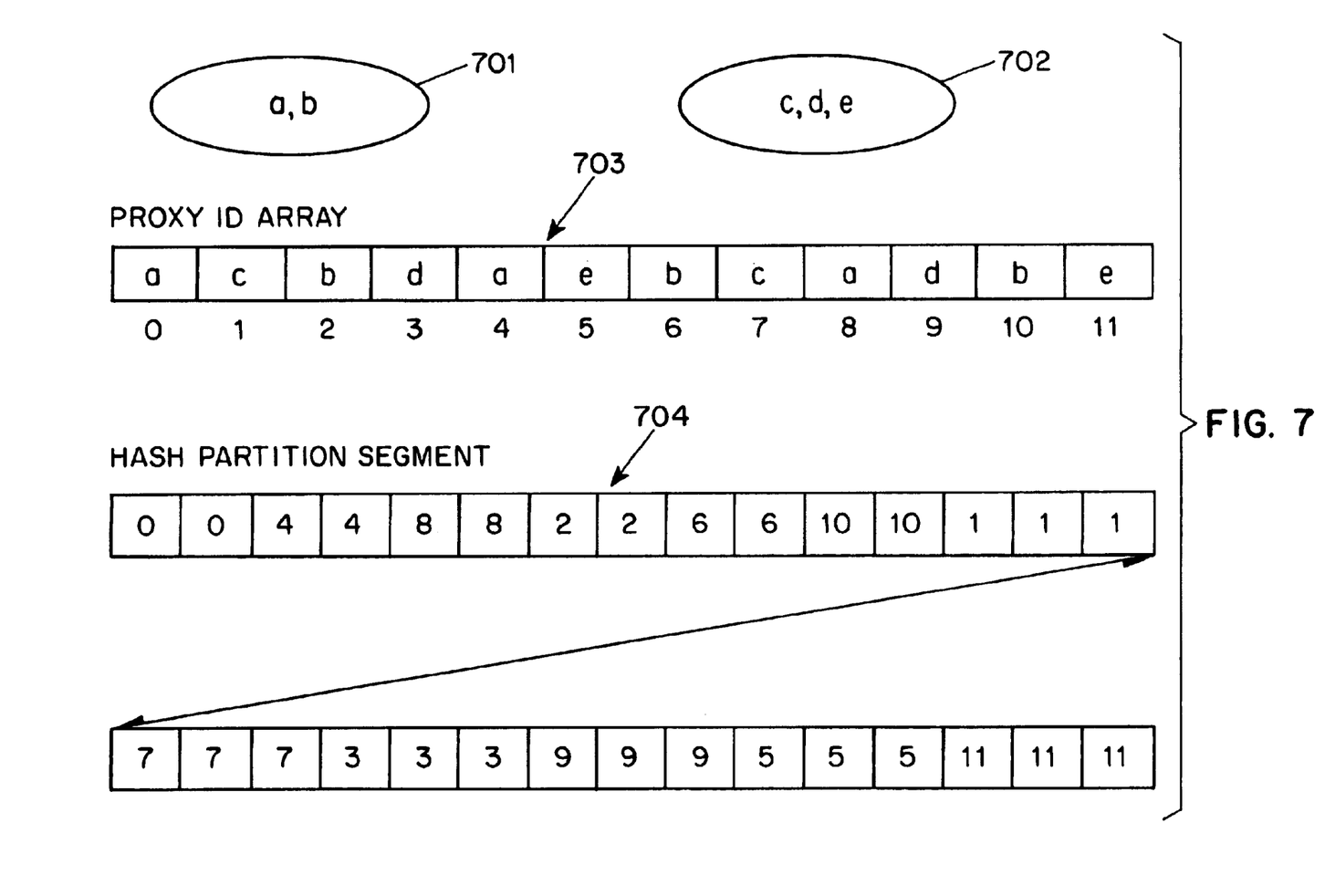
FIG. 7 is a schematic illustration of the mapping of hash partitions to five proxy caches located within two geographical clusters.

To better understand the above the indirect mapping scheme, FIG. 7 shows an example of mapping hash partitions to 5 proxy caches located within two geographical clusters. One contains two proxy caches 701 and the other contains 3 proxy caches 702. Proxies a, b are in the first cluster while proxies c, d, e are in the second cluster. For constructing the proxy ID array, a total of 12 elements is needed since the least common multiple of 2 and 3 is 6. The proxy ID array 703 is then constructed by selecting a proxy from each cluster in a round-robin fashion. Also shown are the indices of the proxy ID array. The hash partition segment 704 is constructed by assigning the indices of the proxy ID array to the hash partitions. Since proxies a, b appear 3 times each in the proxy ID array and proxies c, d, e appear 2 times each, the size of the hash partition segment is 6*5=30 ($LCM_P$=6 and $\Sigma P_j$=5). Moreover, there are 3 appearances of proxy a in the proxy ID array and its indices are 0, 4 and 8. Each index will be assigned to 2 hash partitions (6/3=2). Thus, the first 2 hash partitions are assigned with index 0, the next 2 are assigned with index 4, and the next two are assigned with index 8. Similarly, proxy c appears 2 times in the proxy ID array with indices of 1 and 7. So, there are three hash partitions assigned with index 1 and another 3 partitions assigned with index 7.

It will also be appreciated that the indirect mapping scheme can be easily generalized to the case where each cluster contains proxy caches with unequal processing powers. $R_j$ denotes the relative processing power of proxy caches in cluster j. The total size of the hash bucket segment becomes $LCM_P * \Sigma P_j R_j$. Using the above example in FIG. 7, if proxy caches in the first cluster is twice as powerful as those in the second cluster, the size of the hash partition segment is 6*(2*2+3*1)=42. As a result, there are 4 hash partitions that will be assigned with index 0, 4 hash partitions with index 4, and another 4 with index 8.

It will also be appreciated that with the indirect mapping, the candidate set should be chosen from the nearby proxies in the proxy ID array once the anchor proxy is identified. As such, any candidate set of size M will contain at least one proxy cache ID from each cluster, where M is the total number of clusters. As a result, the indirect mapping ensures that it is likely to find a geographically close proxy cache for any request.

Figure 8:
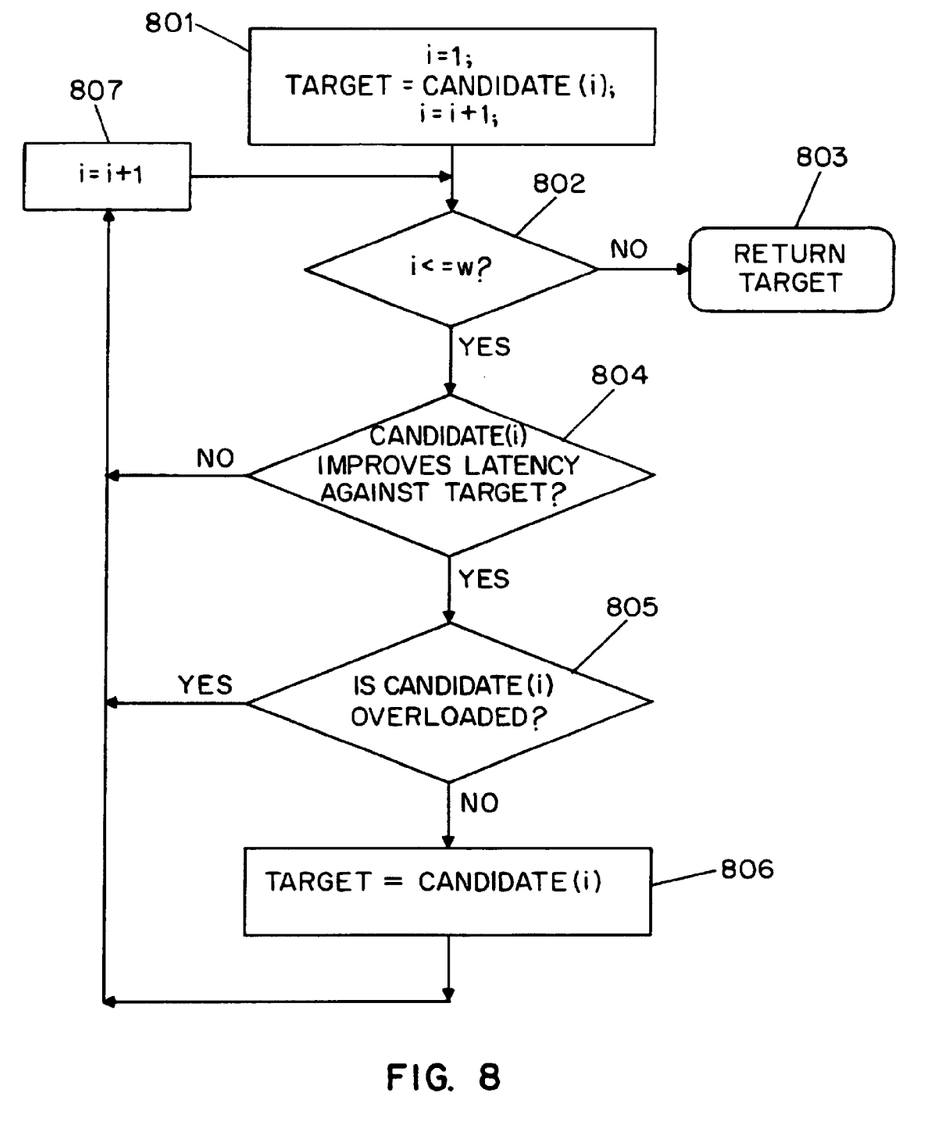
FIG. 8 is a flow chart diagram of the target selection module of FIG. 2.

FIG. 8 shows the flow chart diagram of the target selection module 206 (FIG. 2) in accordance with an exemplary embodiment of the present invention. The variable w denotes the size of the set of candidate proxy caches identified by the candidate identification module 205 (FIG. 2). The target proxy cache is initially set to be the first proxy from the candidate set 801.

The selection module loops through each candidate proxy cache until all w candidate proxies have been examined 802. It examines every candidate proxy cache to see if the latency delay can be improved if the request were to hash into it 804. If yes, the candidate proxy is further examined to see if it is currently overloaded 805. If no, then the candidate proxy becomes the new target 806. Otherwise, the selection module proceeds to examine the next candidate proxy cache from the rest of the candidate set 807. After all candidate proxies are examined, the final target proxy cache is returned 803.

It will also be appreciated that the criteria for improvement in latency can be simply based on the minimum response time. It can also be based on a discounted response time that prefers the anchor proxy cache unless the response time is better by a predetermined amount.

Figure 9:
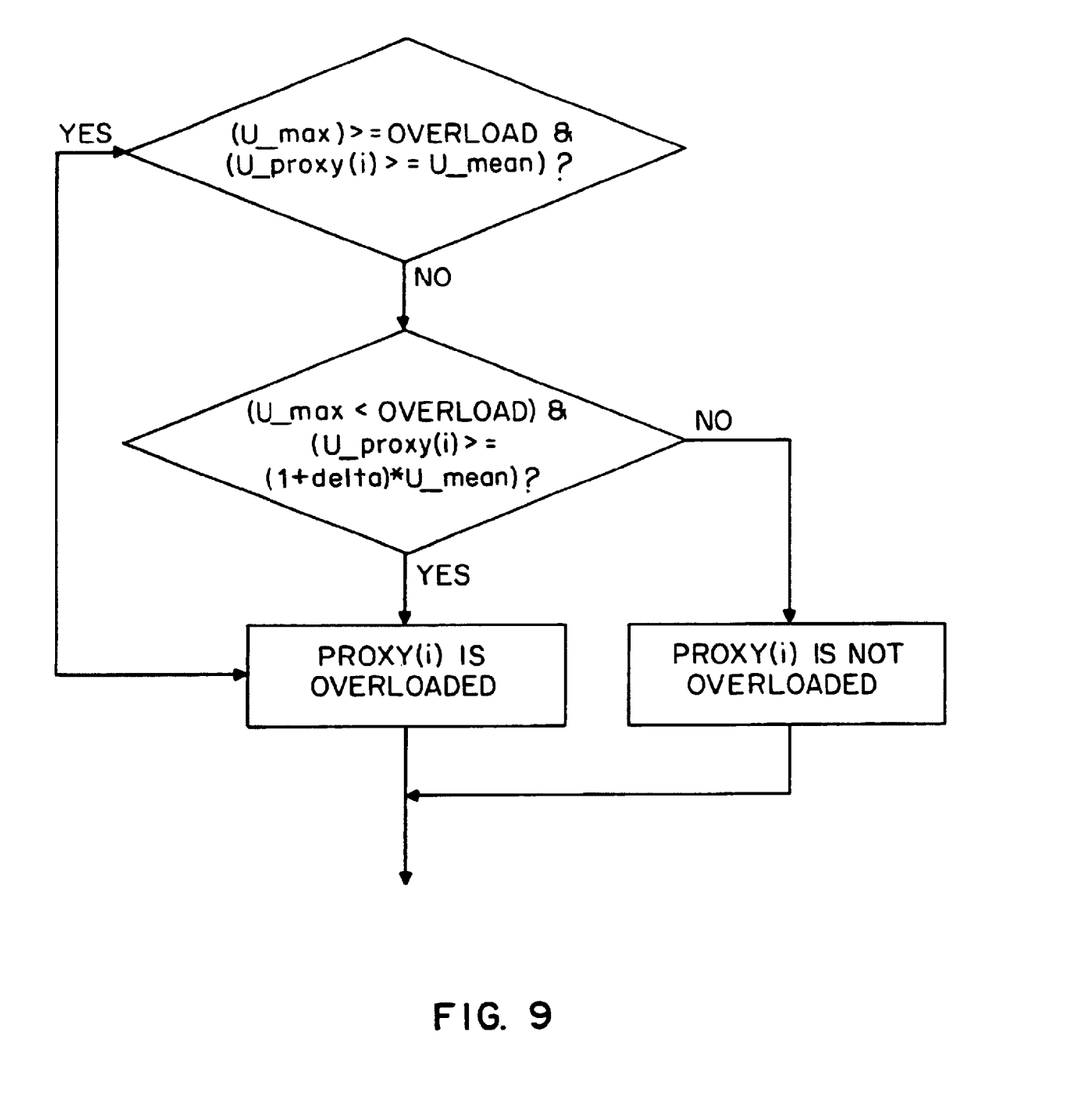
FIG. 9 is a flow chart diagram of the determination of a whether a candidate proxy cache is overloaded (as briefly set forth in FIG. 8).

FIG. 9 is a flow chart diagram of determining whether a candidate proxy cache is overloaded 805 (FIG. 8) in accordance with an exemplary embodiment of the present invention. Assume that the load collection module 207 (FIG. 2) periodically sends a probe message to each collaborating proxy cache for utilization conditions. Such proxy utilization conditions are maintained and the mean utilization and the utilization of the most utilized can be computed. Let U_max denote the utilization of the most utilized proxy cache server among the collaborating proxies and U_mean denote the mean utilization. Assume OVERLOAD is a predetermined constant, say 80%, that is deemed overloaded for a proxy cache server. If the utilization of a proxy cache server is at least as large as U_mean and U_max is at least as large as OVERLOAD 901, then the proxy is considered to be overloaded 903. On the other hand, if U_max is less than OVERLOAD 902, then a proxy is considered to be overloaded 903 only if its utilization is at least as large as (1+delta)*U_mean, where delta is a constant, say 20%. The quantity delta is preferably used to provide an acceptable variance over the mean utilization U_mean before overloading will be considered to occur. A typical, and eminently workable, value for delta would be 20%, although it is to be understood that essentially any number between zero and one is appropriate and acceptable for use as delta.

If neither of the conditions in 901 and 902 are true, then the proxy is not considered to be overloaded 904.

It will also be appreciated that the utilization of the most utilized proxy cache server can be an indication of load imbalance among all the proxy cache servers. If the overall system is highly unbalanced, i.e., U_max is large, then we want to be more conservative in allowing a new request to be hashed into a proxy cache. Thus, a proxy cache server is considered to be overloaded once its utilization reaches U_mean. On the other hand, if the overall system is more balanced, i.e., U_max is small, then there is a desire to be more "aggressive" in allowing a new request to be hashed into a proxy cache. As a result, a proxy cache server is not considered to be overloaded until its utilization is greater than U_mean by at least a certain amount. Besides periodically collecting utilization conditions of all collaborating proxy caches, the load collection module 207 (FIG. 2) also maintains the latency delays between client machines 101, 102 (FIG. 1) and the collaborating proxy caches 105, 106 (FIG. 1). Such latency delays are dependent mostly on geographical distances, but they also depend on dynamic network traffic. The latency delays be periodically updated as well.

It is to be understood that the present invention, in accordance with at least one presently preferred embodiment, includes an identifier for identifying a candidate set of proxy caches for a given URL based on information related to the URL and a selector for selecting a proxy cache from the candidate set at least on the basis of latency. The identifier and selector may be implemented together on a general-purpose computer running suitable software programs. These may also be implemented on an Integrated Circuit or part of an Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Method of selecting a proxy cache, said method comprising the steps of:
   defining a plurality of proxy caches into which a URL is capable of being hashed;
   identifying a candidate set of proxy caches, wherein said identifying comprises:
      hashing the URL into an anchor hash partition in a hashing space;
      forming a candidate set of hash partitions by including one or more nearby partitions in the hashing space into said anchor hash partition;
   mapping each partition to a proxy cache; and
   selecting a proxy cache from the candidate set at least on the basis of latency.

2. The method according to claim 1, wherein said selecting step comprises selecting a proxy cache from the candidate set at least on the basis of latency and load condition.

3. The method according to claim 1, wherein said selecting step comprises selecting a proxy cache from the candidate set of proxies based at least on minimum response time.

4. The method according to claim 1, wherein said selecting step comprises selecting a proxy cache from the candidate set of proxies based at least on discounted response time that prefers the anchor proxy cache unless the response time is better by a predetermined amount.

5. The method according to claim 1, wherein said selecting step comprises selecting a proxy cache from the candidate set of proxies based at least on the condition that a proxy cache server is not overloaded.

6. The method according to claim 1, wherein the nearby partitions comprise partitions with hash values greater than that of the anchor partition.

7. The method according to claim 1, wherein the partitions comprise partitions with hash values less than that of the anchor partition.

8. The method according to claim 1, wherein the nearby partitions comprise partition with hash values both greater and less than that of the anchor partition.

9. The method according to claim 1, wherein said mapping step comprises hashing each hash partition into a number between 1 and P, wherein P represents the total number of proxies.

10. The method according to claim 1, wherein said mapping step further comprising
    for each proxy, generating N/P random numbers between 0 and 1, N represents the total number of hash partition and # represents the total number of proxies;
    generating a prosy list by sorting the corresponding N random number generated; and
    assigning each hash partition to one proxy based on the sorted proxy list.

11. Method of selecting a proxy cache, said method comprising the steps of:
    defining a plurality of proxy caches into which a URL is capable of being hashed;
    creating an indirect mapping of hash partitions to a proxy ID array;
    hashing the URL into an anchor hash partition in a hashing space;
    finding the corresponding anchor proxy cache;
    forming a candidate set of proxy caches by including one or more nearby proxy caches from the proxy ID array into the anchor proxy cache; and
    selecting a proxy cache from the candidate set at least on the basis of latency.

12. The method according to claim 11, wherein the step of creating an indirect mapping of hash partitions to a proxy ID array further comprises:
    forming a proxy ID array with collaborative proxy caches;
    creating a hash partition segment that maps each hash partition to the index of the proxy ID array; and
    replicating the hash partition segment for a predetermined number of times.

13. System for selecting a proxy cache, said system comprising:
    defining a plurality of proxy caches into which a URL is capable of being hashed;
    an identifier adapted to:
        hash the URL into an anchor hash partition in a hashing space;
        form a candidate set of hash partitions by including one or more nearby partitions in the hashing space into said anchor hash partition; and
        map each partition to a proxy cache; and
    a selector for selecting a proxy cache form the candidate set at least on the basis of latency.

14. The system according to claim 13, wherein said selector is adapted to select a proxy cache from the candidate set at least on the basis of latency and load condition.

15. The system according to claim 13, wherein said identifier is further adapted to:
    create an indirect mapping of harsh partition to a proxy ID array;
    hash the URL into an anchor hash partition;
    find the corresponding anchor proxy cache; and
    form a candidate set of proxy caches by including one or more nearby proxy caches from the proxy ID array into the anchor proxy cache.

16. The system according to claim 15, wherein said identifier, in creating an indirect mapping, of hash partitions to a proxy ID array, is adapted to:
    form a proxy ID array with collaborative proxy caches;
    create a hash partition segment that maps each hash partition to the index of the proxy ID array; and
    replicate the hash partition segment for a predetermined number of times.

17. The system according to claim 13, wherein said selector is adapted to select a proxy cache from the candidate set of proxies based at least on minimum response time.

18. The system according to claim 13, wherein said selector is adapted to select a proxy cache from the candidate set of proxies based at least on discounted response time that prefers the anchor proxy cache unless the response time is better by a predetermined amount.

19. The system according to claim 13, wherein said selector is adapted to select a proxy cache from the candidate set of proxies based at least on the condition that a proxy cache server is not overloaded.

20. The system according to claim 13, wherein the nearby partitions comprise partitions with hash values greater than that of the anchor partition.

21. The system according to claim 13, wherein the nearby partitions comprise partitions with hash values less than that of the anchor partition.

22. The system according to claim 13, wherein the nearby partitions comprise partitions with hash values both greater and less than that of the anchor partition.

23. The system according to claim 13, wherein said identifier is adapted to map each hash partition into a number between 1 and P, wherein P represents the total number of proxies.

24. The system according to claim 13, wherein said identifier, in mapping, is adapted to:
    for each proxy, generate N/P random numbers between 0 and 1, wherein N represents the total number of hash partitions and P represents the total number of proxies;
    generate a proxy list by sorting the corresponding N random numbers generated; and
    assign each hash partition to one proxy based on the sorted proxy list.

25. A program storage device readable by machine, tangibly embodying a program of instructions executable by the machine to perform method steps for selecting a proxy cache, said method steps comprising:
    defining a plurality of proxy caches into which a URL is capable of being hashed;
    identifying a candidate set of proxy caches, wherein said identifying comprises:
        hashing the URL into an anchor hash partition in a hashing space;
        forming a candidate set of hash partitions by including one or more nearby partitions in the hashing space into said anchor hash partition;
        mapping each partition to a proxy cache; and
        selecting a proxy cache from the candidate set at least on the basis of latency.

* * * * *